(12) United States Patent
DaSilva

(10) Patent No.: US 7,496,272 B2
(45) Date of Patent: Feb. 24, 2009

(54) RULE-BASED DIGITAL VIDEO RECORDER

(75) Inventor: Daniel R. DaSilva, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 870 days.

(21) Appl. No.: 10/800,286

(22) Filed: Mar. 12, 2004

(65) Prior Publication Data

US 2004/0179815 A1 Sep. 16, 2004

Related U.S. Application Data

(60) Provisional application No. 60/455,153, filed on Mar. 14, 2003.

(51) Int. Cl.
*H04N 5/91* (2006.01)
*H04N 7/00* (2006.01)

(52) U.S. Cl. .......................... 386/46; 386/95

(58) Field of Classification Search ............... 386/95, 386/104, 46; 707/205
See application file for complete search history.

(56) References Cited

U.S. PATENT DOCUMENTS

| | | | |
|---|---|---|---|
| 4,688,106 A | 8/1987 | Keller et al. | |
| 5,305,438 A | 4/1994 | MacKay et al. | |
| 5,574,662 A | 11/1996 | Windrem et al. | |
| 5,590,381 A | 12/1996 | Mourad | |
| 5,671,386 A | 9/1997 | Blair et al. | |
| 5,732,239 A | 3/1998 | Tobagi et al. | |
| 5,808,628 A | 9/1998 | Hinson et al. | |
| 6,134,586 A | 10/2000 | Walker | |
| 6,144,391 A | 11/2000 | Hinson et al. | |
| 6,289,172 B1 | 9/2001 | Windrem et al. | |
| 6,292,852 B1 | 9/2001 | Bodo et al. | |
| 6,360,058 B1 | 3/2002 | Yoshimoto et al. | |
| 6,434,323 B1 * | 8/2002 | Hayashi | 386/104 |
| 6,438,319 B1 | 8/2002 | Inoue et al. | |
| 7,096,237 B2 * | 8/2006 | Kimura et al. | 707/205 |
| 2003/0067554 A1 * | 4/2003 | Klarfeld et al. | 348/461 |

* cited by examiner

*Primary Examiner*—Thai Tran
*Assistant Examiner*—Hung Q Dang
(74) *Attorney, Agent, or Firm*—Paul T. Kashimba, Esq.

(57) ABSTRACT

This invention provides methods for managing the overwriting of existing stored video data with new incoming video data by prioritizing all video categories, and establishing rules for each level of priority. The methods are based upon the classification or prioritization of the each video segment into discrete categories. Rules are established for each particular category. Then as incoming video arrives, a two-part filtering system is used to identify which existing video will be overwritten. First, video in the lowest priority category is identified. Then the retention rules are applied to the identified video in the category to determine whether it can be overwritten. This two step filtering process is repeated for each category from lowest to highest until sufficient space is made available to receive the incoming video. The prioritization of the categories may be changed in real time by the user, according to the value or importance of any particular existing stored video in order to preserve it.

17 Claims, 4 Drawing Sheets

FIG. 1

| Block | LBA | Priority | Age |
|---|---|---|---|
| 0 | 0-9999 | Empty | No Video |
| 1 | 10000-19999 | Empty | No Video |
| 2 | 20000-29999 | Empty | No Video |
| 3 | 30000-39999 | Empty | No Video |
| 4 | 40000-49999 | Empty | No Video |
| 5 | 50000-59999 | Empty | No Video |
| 6 | 60000-69999 | Empty | No Video |
| 7 | 70000-79999 | Empty | No Video |
| 8 | 80000-89999 | Empty | No Video |
| 9 | 90000-99999 | Empty | No Video |

FIG. 2

| Block | LBA | Priority | Age |
|---|---|---|---|
| 0 | 0-9999 | Four | 0.0 Days |
| 1 | 10000-19999 | Empty | No Video |
| 2 | 20000-29999 | Empty | No Video |
| 3 | 30000-39999 | Empty | No Video |
| 4 | 40000-49999 | Empty | No Video |
| 5 | 50000-59999 | Empty | No Video |
| 6 | 60000-69999 | Empty | No Video |
| 7 | 70000-79999 | Empty | No Video |
| 8 | 80000-89999 | Empty | No Video |
| 9 | 90000-99999 | Empty | No Video |

FIG. 3

| Block | LBA | Priority | Age |
|---|---|---|---|
| 0 | 0-9999 | Four | 3.0 Days | — 31
| 1 | 10000-19999 | Three | 2.0 Days | — 43
| 2 | 20000-29999 | Four | 2.0 Days | — 47
| 3 | 30000-39999 | Two | 1.3 Days | — 42
| 4 | 40000-49999 | One | 1.8 Days | — 41
| 5 | 50000-59999 | Three | 3.0 Days | — 44
| 6 | 60000-69999 | Three | 0.0 Days | — 45
| 7 | 70000-79999 | Three | 1.0 Days | — 46
| 8 | 80000-89999 | Four | 0.0 Days | — 48
| 9 | 90000-99999 | Four | 1.0 Days | — 49

FIG. 4

| Block | LBA | Priority | Age |
|---|---|---|---|
| 0 | 0-9999 | One | 0.0 Days | — 51
| 1 | 10000-19999 | Three | 2.0 Days | — 43
| 2 | 20000-29999 | Four | 2.0 Days | — 47
| 3 | 30000-39999 | Two | 1.3 Days | — 42
| 4 | 40000-49999 | One | 1.8 Days | — 41
| 5 | 50000-59999 | Three | 3.0 Days | — 44
| 6 | 60000-69999 | Three | 0.0 Days | — 45
| 7 | 70000-79999 | Three | 1.0 Days | — 46
| 8 | 80000-89999 | Four | 0.0 Days | — 48
| 9 | 90000-99999 | Four | 1.0 Days | — 49

FIG. 5

RULE-BASED DIGITAL VIDEO RECORDER

This application claims the benefit of U.S. Provisional Application No. 60/455,153, filed on Mar. 14, 2003.

BACKGROUND OF THE INVENTION

1. Field of the Invention

The present invention relates to a method for storing video data on digital video recorders, and more particularly, to a method for prioritizing such data and overwriting previously recorded data according to predefined rules provided by the operator.

2. Description of the Prior Art

Video data is made up of numerous individual digital pictures, sometimes referred to as frames. These frames are still pictures, and must be run sequentially at high speeds to create the effect of motion within the video. The file size of each frame varies, depending upon its quality, dimensions, and other characteristics. The combination of these frames into a single video data file or stream results in the video data having a high volume of information, and consequently, a large file size. This file size increases with the duration, quality, dimensions, and other characteristics of the video. As a result, video data is generally larger in size than its traditional data file counterparts, even after compression routines are performed upon it. Therefore, applications involving the creation or maintenance of video data often require larger and/or more efficient storage means.

Digital video recorders store video data upon various storage media for future selectable review. These media are generally designed to hold anywhere from several hours to several weeks of video images. However, all media have finite capacities. Once such capacities are reached, the operator must insert new (empty) media into the video recorder, or recycle the current media for subsequent reuse. Depending upon the sheer volume of video data received by the recorder, the former alternative may become cost-prohibitive within a short period of time.

Accordingly, reusing or recycling the media is commonly implemented. However, devices implementing such an alternative generally overwrite the existing video data in a sequential manner. This means that, once a storage medium is full, the recorder simply returns to the first sector of the medium and overwrites the existing video data from that point onward. Such a method does not take into consideration the potential importance or value of the data being overwritten—it simply overwrites the existing data in a sequential manner without regard to any priority the data may have. The result is that non-essential video may be retained, while essential video is deleted, simply because the essential events were recorded earlier in time.

It is therefore desirable to provide a method of reusing or recycling video data storage capacity once the storage medium has become full by overwriting the existing video data with new data such that the existing data is prioritized, so that existing low-priority data is overwritten instead of, or prior to, existing high-priority data. It is further desirable that the method be capable of receiving a real-time video data stream, and overwriting the existing data in real-time. It is further desirable that the priority of such existing data be redefinable in real-time.

SUMMARY OF THE INVENTION

The present invention provides methods for managing the overwriting of existing video data files or segments (discrete portions of video data) with new incoming video data by prioritizing all video and establishing rules for each level of priority. The method is based upon the classification or prioritization of the particular video segments into discrete categories, according to, for example, their sources, the events depicted within them, manual classification by the operator, or the like. The prioritization of the categories may be changed in real time by the user, according to the value or importance of any particular video. Then rules are established, such as a minimum lifespan for each particular category, to determine how long the data should be kept. Information pertaining to such parameters may be stored within an index.

A first parameter categorizes the video segments according to such things as their source(s), the events depicted therein, the relationship of the segment to some event or alarm, or the like. Such sources or events generally fall into the following categories: video recorded on a constant basis; video recorded at scheduled dates and/or times; video recorded upon the occurrence of an anticipated and predefined event; video recorded upon the occurrence of an unanticipated (sometimes predefined) event; or video recorded upon changes in the environment. The category of a particular video segment may also be changed manually by the operator, or automatically upon the occurrence of certain events.

The operator may also prioritize the different categories, depending upon his or her particular requirements. Such priorities provide an initial determination as to which video segments are to be overwritten first by new video data. Specifically, and as described in greater detail herein, video segments having a lower priority are generally more likely to be overwritten than video segments having a higher priority.

Rules may be defined by the operator that provide a secondary determination as to when video segments of a particular category may be overwritten. The simplest form of such rules calls for comparison of the initial recording date of the particular video segment, to the system date at the time new video segments are being stored. As described in greater detail herein, a video segment may be overwritten only when its age equals or exceeds the minimum lifespan requirement for its particular category.

In use, the operator first establishes the priorities for each kind of video data that may be received (scheduled, alarm, archive, etc.). The user then establishes rules for the handling of video data within each level of priority. For example, rules could be established for a minimum lifespan requirement for each category. Video data is then received by the digital video recorder, classified into one of the categories, and recorded upon the storage medium. The physical location of the video segment upon the medium, its priority level, and the date it was recorded, are placed in an index.

Once the storage medium is full, the present invention must overwrite the existing video data with new data. This is accomplished using a two-step filtering process. The present invention first filters the index to locate all existing video segments of the lowest priority category. It then filters the list of returned video segments by comparing the age of each segment with the minimum lifespan requirement for that particular category. Those segments younger than the minimum lifespan requirement are removed from the list so that they are saved. The remaining video segments may be overwritten. If only one segment remains after both filters are applied, it is overwritten by the new video data. If more than one video segment remains, the remaining segments are all compared against one another using the user-defined rules to determine which should be overwritten first. According to age-based rules, the oldest segment would then overwritten by the new data.

If there are no video segments within that particular category, or if all video segments in that category do not satisfy the rules (e.g., their ages do not equal or exceed the minimum lifespan requirement), the invention proceeds to the next higher priority category, and repeats the two-step filtering process upon the existing video segments of that higher category. Eventually, one or more suitable video segments will be located and overwritten by the new data. The present invention then repeats the process for each subsequent block of new data, beginning once again with the lowest priority category. Thus, according to the methods of the invention, video segments having the lowest priority are generally overwritten first by new incoming video data, while higher priority files are maintained for longer periods of time, if not indefinitely.

The rules such as the minimum lifespan requirement for any category may be changed by the operator at any time. Such changes will affect all subsequent determinations under the second step of the two-step filtering process described herein, since those subsequent determinations will be evaluated using the new rule (e.g., the minimum lifespan requirement).

It is therefore a primary object of the present invention to provide a method for managing the use and reuse of data storage capacity once that storage capacity has become full, namely by overwriting the existing video data with new data according to a set of user-defined priorities and rules.

It is another primary object of the present invention that existing video data be prioritized by the operator, such that low-priority data is overwritten instead of, or prior to, high-priority data.

It is another object of the present invention that it be capable of receiving real-time video data streams from external sources, and overwriting, in real-time or substantially real-time, the existing video data upon the storage medium, according to an operator-defined data priority list and rules.

It is another object of the present invention that the priorities for the video data categories be adjustable in real-time, so that the adjustments have a real-time effect upon the preservation of the applicable video data segments.

Additional objects of the invention will be apparent from the detailed description and the claims herein.

BRIEF DESCRIPTION OF THE DRAWINGS

FIG. 2 is an illustration of a typical index of the present invention.

FIG. 3 is an illustration of an index of the present invention, wherein a single block of video data has been recorded upon the storage medium.

FIG. 4 is an illustration of an index of the present invention, wherein the entire storage medium has been filled with video data.

FIG. 5 is an illustration of an index of the present invention, wherein one block of new video data is recorded upon the storage medium by overwriting one block of existing video data.

DETAILED DESCRIPTION

Figure 1:
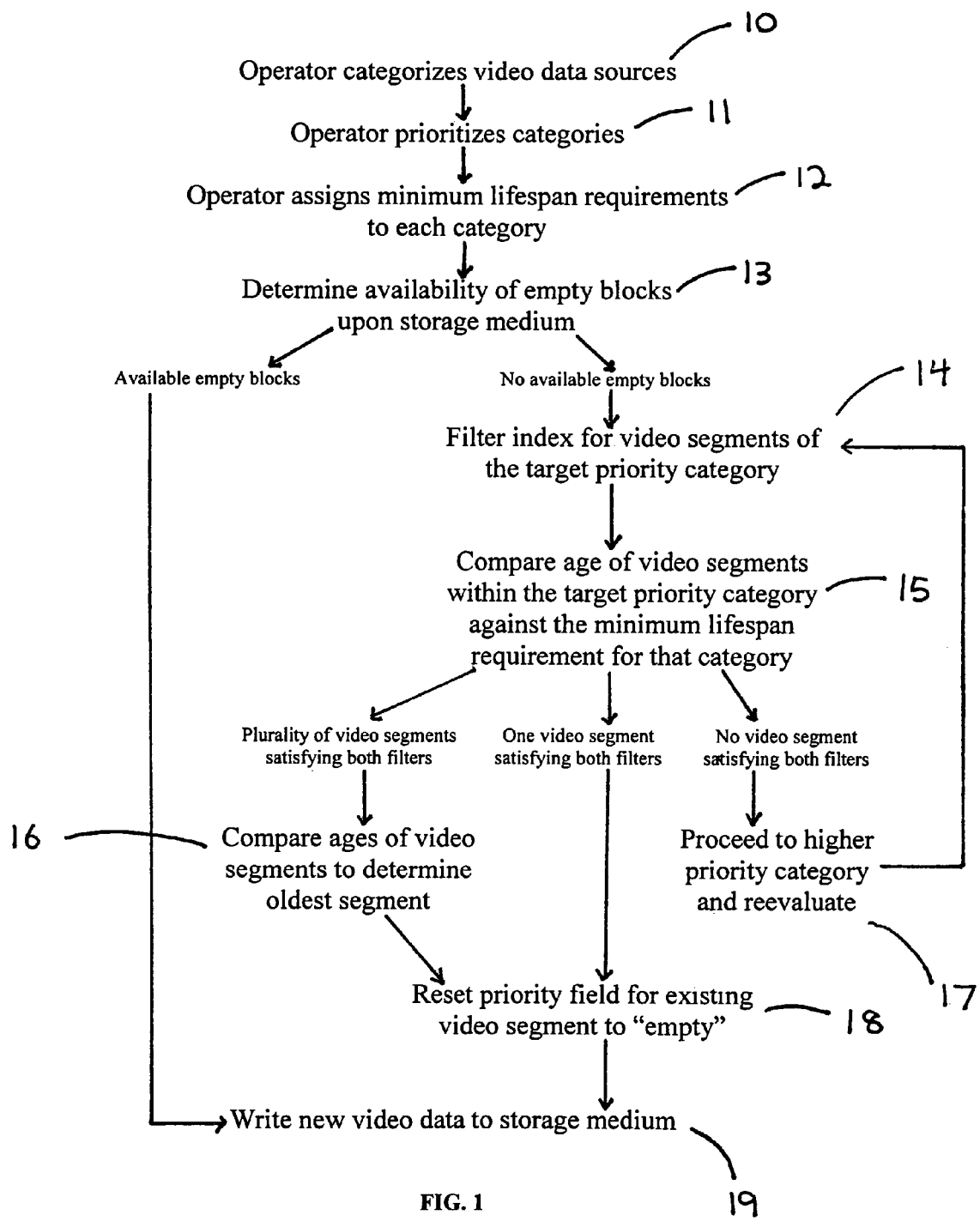
FIG. 1 is a flowchart depicting general steps of the present invention.

Referring to the drawings wherein like reference characters designate like or corresponding parts throughout the various views, and referring particularly to FIG. 1, it is seen that the present invention is a method for storing and overwriting video data based upon certain predetermined priorities and rules provided by the operator. The invention is based upon the parameters of an operator-definable classification 10 of the video data into discrete categories, an operator-definable prioritization 11 of the categories, and operator-definable rules 12, such as a minimum lifespan requirement, for each priority.

The video data sources are categorized 10 by the operator on one or more of the following bases: its particular source (camera, location, scene, etc.); the events depicted therein (movement, etc.); or upon manual review by the operator. For example, video data received from constantly recording (twenty-four hours per day, seven days per week) cameras may be categorized as "Routine Recordings." Data received from cameras activated according to a predefined schedule, such as 8:00 a.m. to 5:00 p.m., Monday through Friday, may be categorized as "Scheduled Recordings." Videos of regular predefined events, such as movement across the camera's field of vision or the opening of a door, may be categorized as "Event Recordings." Videos of unexpected events, such as the breaking of a window, may be categorized as "Alarm Recordings." Finally, the operator may review video from any one of these categories and determine that it should be preserved; such video would be manually classified by the operator as "Archived Recordings." Other categories may be also be defined, according to the particular requirements of the operator.

The category classification(s) 10 of one or more video segments may be manually altered at any time by the operator. This feature is used when the operator wishes to affect the retention of one or more particular video segments. For example, the operator may determine, after reviewing a particular video segment, that it should be preserved for a longer period of time than otherwise provided for by its particular category. The operator may change the current segment category to one that provides a longer retention period, or define a new category entirely (such as "Archived Recordings"), with a higher priority, and assign the segment to that new category. The category may also be altered automatically upon the occurrence of a predefined event. For example, the occurrence of an alarm recording may cause the previous ten minutes of the scheduled recording to be promoted to an alarm category (having a higher priority) for longer preservation.

The user-defined categories are prioritized 11 according to the operator's particular criteria, based upon the operator's determination as to the necessity of preserving such video. As described in greater detail herein, such priorities will provide the first step of a two-step filtering process to determine which particular video segments will be erased to create available capacity upon the storage medium for new video segments.

Rules may also be established for each priority. For example, and without limitation, each priority may also be assigned a minimum lifespan requirement 12. Such a minimum lifespan requirement 12 would be used in the second step of the filtering process, and represents the minimum age of the video segment before it is subject to being selected for overwriting. As described in greater detail herein, such a requirement 12 prevents more recent video segments from being erased by subsequent data while older, and more suitable, video segments are available. Other rules may also be implemented to affect which video within a given category is to be overwritten first including, for example, and without limitation, the size of the video segment(s), the relationship of the video segment to other video segments, the type of data storage media upon which the video segment is stored, the particular data storage device used to store the video segment, and the like.

The rules such as the minimum lifespan requirement 12 of one or more priority categories may also be altered at any time. This feature is used when the operator wishes to affect the retention of all video segments within a particular priority category. Such alteration causes all subsequent determinations under the second step of the two-step filtering process to be evaluated under the new rule (e.g. changing the minimum lifespan requirement of priority 2 video from 3 days to 6 days).

FIG. 2 depicts a typical exemplary index 20 of the present invention. The index comprises entries for each video data segment recorded upon the storage media. Each entry (one per video segment) comprises of the following information: the physical location 21, 22 (sectors, blocks and/or logical block addresses) of the video segment upon the storage medium; the priority category 23 of the segment, based upon the classification rule set provided by the operator; and other pertinent information 24 for user-defined rules such as the age of the video segment, the media type upon which it is stored, etc. The index may be of any form or combination of forms, such as arrays or linked lists.

In use, when new video data is recorded to the storage medium, the present invention first determines 13 if there are available empty blocks for recording the data. If empty blocks are available, the new data is recorded 19 upon those empty blocks. If there are no empty blocks available, or if there are an insufficient number of empty blocks available, the invention filters 14 the index to locate all existing video segments of the lowest priority category. The resulting list is then filtered 15 again, by applying the user-defined rules, such as comparing the "age" field of each eligible video segment entry to an established minimum lifespan requirement 12 for that particular category. Segments of that category, with ages equal to or exceeding the minimum lifespan requirements of that category, are made available for subsequent overwriting. If a plurality of eligible video segments remains after both filters are applied, all of them are compared 16 against one another on the basis of the applicable rule (e.g., their individual ages). The priority of the index entry for the oldest video segment among them is then set 18 to "empty." If only one entry remains after both filters are applied, its priority is set 18 to "empty" so that it is available to be overwritten.

In this example, if no video segments within the lowest priority category have ages equal to, or exceeding, the minimum lifespan requirement 12 for that priority category, the invention proceeds to the next higher category. The process described above is repeated, using the minimum lifespan requirement 12 for the new priority category. Such process may be repeated several times until eligible storage capacity is found for the new video data in some priority category. The new video data is then recorded 19 at the physical location specified by the empty index entry, thereby overwriting the previous video segment stored at that physical location.

An alternative embodiment of the present invention further minimizes unused storage capacity by permitting several video segments to share a single block. The priority level of the shared block equals the highest priority level of the segments recorded upon the block. The age of the block may be equal to the oldest or youngest video segment recorded upon the block, depending upon operator preferences.

EXAMPLE OF THE PRESENT INVENTION IN ACTION

An example of the present invention is provided below. Assume that a store utilizes a system of four security cameras connected to a digital video recorder. The operator first assigns video output 10 from each camera to a particular category 11. In this example, the first camera is directed toward the rear alley exit, and provides a constant video stream of the exit (a routine recording). The second camera is directed toward the cashier's station, and is activated during regular store hours (a scheduled recording). The third camera is directed toward, and in communication with, the automatic doors of the store entrance, so that the camera is activated whenever the doors are opened (an event recording). The fourth camera is directed toward the manager's office, and in communication with a security keypad upon the door, so that it is activated only when the door is opened without first disabling the alarm system (an alarm recording).

In this example, assume that the operator has prioritized the different categories 11 of video data as follows: The alarm recording is assigned the highest priority (priority one), followed by the event recording (priority two) and the scheduled recording (priority three). Finally, the routine recording is assigned the lowest priority (priority four). The operator also established a rule 12 assigning a minimum lifespan requirement for each category, as follows: seven days for the priority one alarm recordings; five days for the priority two event recordings; three days for the priority three scheduled recordings; and one day for the priority four routine recordings.

FIG. 2 depicts the index 20 of an empty storage medium. The storage medium used within this example is formatted to contain 100,000 logical block addresses (LBA), divided into ten blocks of 10,000 LBA each. It is to be understood, however, that thousands of blocks may exist upon an actual storage medium, depending upon the capacity of, and formatting method used upon, the medium. The "block" 21 and "logical block address" 22 fields represent the physical locations of the video segments upon the storage medium. This permits the video segments to be stored at any location upon the storage medium, allowing the present invention to incorporate methods of storage space optimization already known in the art. It also permits the video replay order to be sorted or rearranged, without having to actually move the video segments between physical locations upon the medium. The priority level of each video segment, as determined by the operator's previous ordering of categories, is recorded in the "priority" field 23. The age of each video segment, i.e. the number of days since the video was first recorded (obtained by comparing the current system date to the date the video was taken), is recorded in the "age" field 24.

FIG. 3 depicts the index 20 of the same storage medium after the first video segment 31 is recorded upon the medium. Here, the segment 31 is a routine recording (priority four) stored in block 0 (LBA 0-9999) of the medium. It is to be appreciated that the video segment does not have to be recorded at block 0; instead, because the physical location of each video segment is recorded by the index, the segment may be recorded upon any empty block of the medium, so long as its physical location is reflected within the index 20. Because the segment was recently recorded, the "age" field 24 is 0.0 days.

FIG. 4 depicts the index 20 of the same storage medium after three days of operation. As indicated by the index 20 entries, the storage medium capacity has been reached. The video segments have been recorded in non-sequential order upon the medium, and comprise one alarm recording 41 (priority one, at block 4), one event recording 42 (priority two, at block 3), four scheduled recordings 43-46 (priority three, at blocks 1, 5, 6 and 7, respectively) and four routine recordings 31, 47-49 (priority four, at blocks 0, 2, 8 and 9, respectively).

Because the storage medium is now full, recording any new video data upon the medium will require one or more existing video segment(s) to be overwritten. Assume then, that a priority one video segment 51 (depicted in FIG. 5) is to be recorded upon the medium. The invention first verifies 13 that there are no empty blocks available. It then filters the index 20 to locate 14 all video segments within the lowest priority category (priority four). Here, the index returns a list indicating that blocks 0, 2, 8 and 9 (numerals 31, 47-49, respectively) contain video segments of priority four. The invention then filters 15 the list according to the one day minimum lifespan requirement for priority four segments. The video segment at block 8 (numeral 48) is 0.0 days old. It is therefore removed from the list, leaving the video segments at blocks 0, 2 and 9 (numerals 31, 47, 49, respectively). The index entries for these remaining video segments are then compared 16 against one another to determine which video segment among them is the oldest. Block 0 (numeral 31) is the oldest video segment. Therefore, its priority is set 18 to "empty" and it is overwritten 19 by the new video data 51, resulting in the index depicted in FIG. 5.

Further suppose that the operator subsequently changes the minimum lifespan requirements 12' for the various categories 10 to the following durations: ten days for the priority one alarm recordings; six days for the priority two event recordings; five days for the priority three scheduled recordings; and four and a half days for the priority four routine recordings.

Figure 6:
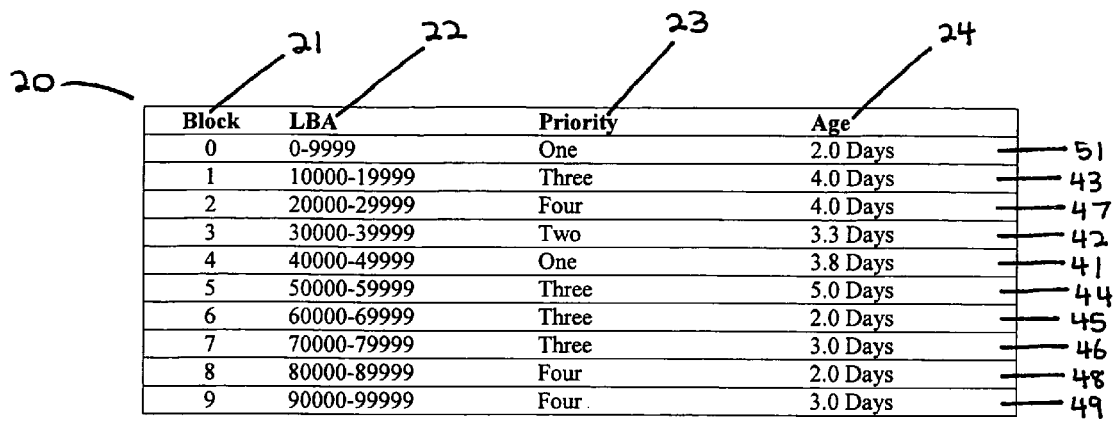
FIG. 6 is an illustration of the index of FIG. 5, wherein the index is aged by a period of two days.

FIG. 6 depicts the index of the same storage medium after two idle days, i.e. days in which no new video data is recorded upon the storage medium. The index 20 entries generally remain unchanged, except that the "age" field 24 of each entry is incremented to reflect the passage of time.

Figure 7:
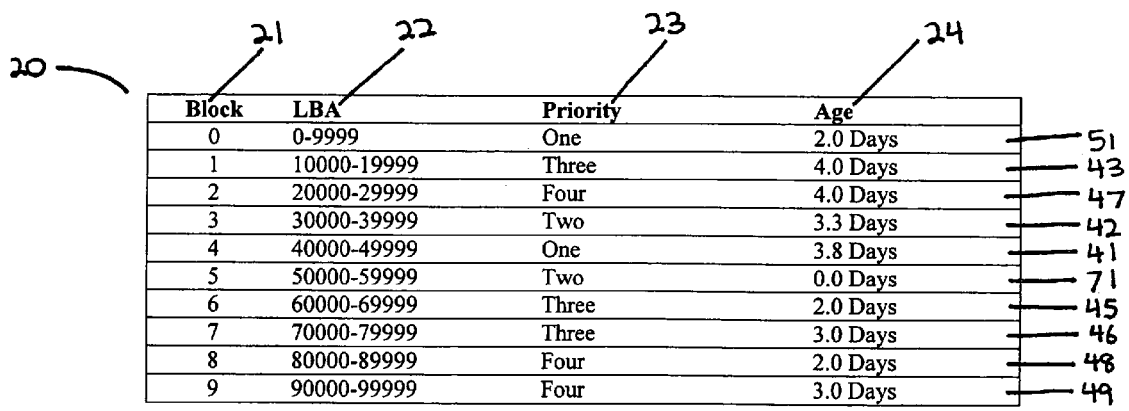
FIG. 7 is an illustration of the index of the present invention, wherein one block of new video data is recorded upon the storage medium after a change in the minimum lifespan requirements.

A priority two video segment 71 (depicted in FIG. 7) is to be recorded upon the medium. The invention first verifies 13 that there are no empty blocks available. It then filters the index 20 to locate 14 all video segments with the lowest priority category group (priority four). Here, the index 20 returns a list indicating that blocks 2, 8 and 9 (respectively, numerals 47-49) contain video segments of priority four. The invention then filters 15 the list according to the new minimum lifespan requirement 12' for the priority four segments. None of the priority four video segments equal or exceed the minimum lifespan requirements 12'. Therefore, none of the priority four segments will be overwritten. The invention then proceeds 17 to the priority three files 14'. The index returns a list indicating that blocks 1, 5, 6 and 7 (respectively, numerals 43-46) contain video segments of priority three. The invention then filters 15 the list according to the new minimum lifespan requirement for the priority three segments, leaving only the video segment at block 5 (numeral 44). The priority field of Block 5 is set 18 to "empty" and it is overwritten 19 by the new video data 71, resulting in the index depicted in FIG. 7.

As demonstrated by the foregoing example, video segments having lower priorities are overwritten first by the incoming video data, while higher priority files are maintained for longer periods of time, if not indefinitely. The higher priority files are overwritten only if the lower priority files are too recent to be overwritten.

In another example, the rule processor makes the lowest priority space available for receiving new video data according to the following steps:

1. If empty block(s) are needed go to step 2, otherwise go to step 12.
2. Find the date of oldest block in the system with lowest priority.
3. If the date of lowest priority block is older than required by the rule for low priority blocks, then mark the block as "empty."
4. Repeat steps 2 and 3 until a date is found that is no longer older than required by rules.
5. If more empty block(s) are still needed, then repeat steps 2 through 4 using the next-lowest priority blocks.
6. If more empty blocks (s) are still needed, then repeat step 5 (steps 2 through 4) using the next lowest priority blocks, and so on until all priority levels have been searched.
7. If more empty block(s) are still needed then do the following:
8. Find the date of oldest block in the system with lowest priority.
9. Free the needed amount of lowest priority blocks by marking them as "empty."
10. If more empty block(s) are still needed, then repeat steps 8 and 9 using the next lowest priority blocks.
11. If more empty block(s) are still needed then repeat step 10 (steps 8 and 9) using the next lowest priority until enough blocks are empty to store the new video.
12. Store the new video in the empty blocks.

It is to be understood that variations and modifications of the present invention may be made without departing from the scope thereof. It is also to be understood that the present invention is not to be limited by the specific embodiments disclosed herein, but only in accordance with the appended claims read in light of the foregoing specification.

What is claimed is:

1. A method for storing units of incoming video data on a storage medium comprising the steps of:
   a. establishing different priority levels for video data;
   b. establishing at least one rule for each of said priority levels, wherein one of said rules comprises a retention time;
   c. assigning one of said priority levels and a creation time to each unit of incoming video data;
   d. storing said units of incoming video data on said storage medium until all storage locations thereon are occupied; and
   e. thereafter, for each unit of incoming video data, and beginning at the lowest priority level and continuing to successively higher priority:
      (i) examining stored video data and identifying a location on said medium where the difference between the creation time of the incoming video and the creation time of video data stored at such location is greater than the retention time applicable to said priority level; and
      (ii) storing said unit of incoming video data by overwriting stored video data at said identified location.

2. The method of claim 1 wherein during said examining step the difference between the creation time of said incoming unit of video data and the creation time of video data stored at such location is at least equal to the retention time applicable to said priority level.

3. The method of claim 1 wherein in the event that more than one stored video at a given priority level is determined to be expendable, the oldest such video is overwritten first by the incoming video.

4. The method of claim 1 wherein at least one of said priority levels comprises an infinite retention time.

5. The method of claim 1 wherein at least two different priority levels are established, and a rule for each of said priority levels comprises a different retention time such that successively higher priority levels have successively longer retention times.

6. The method of claim 1 comprising the additional step of reassigning the priority level of at least one stored video data unit in real time in order to change the availability of the space occupied by the associated data on said storage medium.

7. The method of claim 1 wherein said step of examining stored video data further comprises the steps of identifying stored video data at a priority level having the oldest creation time, and skipping to the next higher priority level if the difference between the creation time of the incoming video and the creation time of the stored video data currently being examined is not greater than the retention time applicable to said priority level.

8. The method of claim 1, wherein said assigned priority level corresponds to a type of video data.

9. A method for prioritizing data to determine which of a plurality of stored data on a filled storage medium may be overwritten with new data comprising the steps of:
   a. establishing different priority levels for stored data;
   b. establishing at least one rule for maintaining stored data at each of said priority levels, wherein one of said rules includes a retention time;
   c. assigning one of said priority levels and a creation time to each new data unit; and
   d. beginning with the lowest of said priority levels and continuing to successively higher priority levels, and also beginning with stored data having the oldest creation time and continuing to stored data having successively younger creation dates and times, identifying stored data that may be overwritten as that data for which the difference between the creation time of the incoming data and the creation time of the stored data is at least equal to the retention time applicable to the priority level of said stored data;
   e. overwriting said stored video data with said new video data.

10. The method of claim 9 comprising the additional step of reassigning the priority level of stored data in real time in order to change the availability of the space occupied by the associated data on the storage medium.

11. The method of claim 9 wherein in the event that more than one stored data unit at a given priority level is determined to be expendable, the oldest such data unit is overwritten first by a new data unit.

12. The method of claim 9, wherein at least one rule may be changed in real time.

13. The method of claim 9 further comprising the steps of identifying stored video at a priority level having the oldest creation time, and skipping to the next higher priority level if the difference between the creation time of the incoming video and the creation time of the stored video currently being examined is less than the retention time applicable to said priority level.

14. The method of claim 9, wherein said assigned priority level corresponds to a type of video data.

15. A method for managing units of incoming video data and units of stored video data on a storage medium comprising the steps of:
   a. establishing a set of priority levels for video data of different types;
   b. establishing at least one rule for maintaining video data at each of said priority levels, wherein one of said rules comprises a retention time;
   c. assigning one of said priority levels and a creation time to each incoming video data unit;
   d. using a table to maintain at least an assigned priority level, a creation time, and an address for any units of video data stored at each of a plurality of storage locations on said storage medium;
   e. if said table reflects that empty storage locations are available on said storage medium, storing said units of incoming video data in those empty storage locations and updating the corresponding entries in said table and
   f. if units of incoming video data remain to be stored and said table reflects that empty storage locations are not available on said storage medium, then scanning said table to identify an entry for a stored video data unit that may be overwritten, said scan beginning at the lowest of said priority levels and beginning with the oldest creation time at such priority level, and moving progressively forward from the oldest entry within each priority level, and progressively upward from the lowest priority level:
      (i) identifying a table entry corresponding to a storage location where the difference between the creation time of the incoming video and the creation time reflected in the table entry for such location is greater than the retention time applicable to said priority level, and for each such identified entry
      (ii) overwriting the video data at the storage location corresponding to the identified table entry with said new video data and updating the corresponding entry in said table.

16. The method of claim 15 wherein in the event that more than one stored video at a given priority level is determined to be expendable, the oldest such video is overwritten first by the new video.

17. A method for storing units of incoming video data on a storage medium comprising the steps of:
   a. establishing different priority levels for video data;
   b. establishing at least one rule for each of said priority levels, wherein one of said rules comprises a retention time;
   c. assigning one of said priority levels and a creation time to each unit of incoming video data;
   d. storing said units of incoming video data on said storage medium until all storage locations thereon are occupied; and
   e. thereafter, for each unit of incoming video data, beginning at the lowest priority level and continuing to successively higher priority levels, examining stored video data and, beginning with a stored video data having the oldest creation time and continuing to stored video data having successively younger creation dates and times, determining whether the difference between the creation time of the incoming video and the creation time of the stored video currently being examined is not greater than the retention time applicable to said priority level, and
      (i) if so, then skipping to the next higher priority level and continuing the examination of stored video; and
      (ii) if not, then storing said unit of incoming video data by overwriting said current stored video data.

* * * * *